March 18, 1924.
H. S. BERGEN
WEIGHING SCALE
Filed March 22, 1922
1,486,944
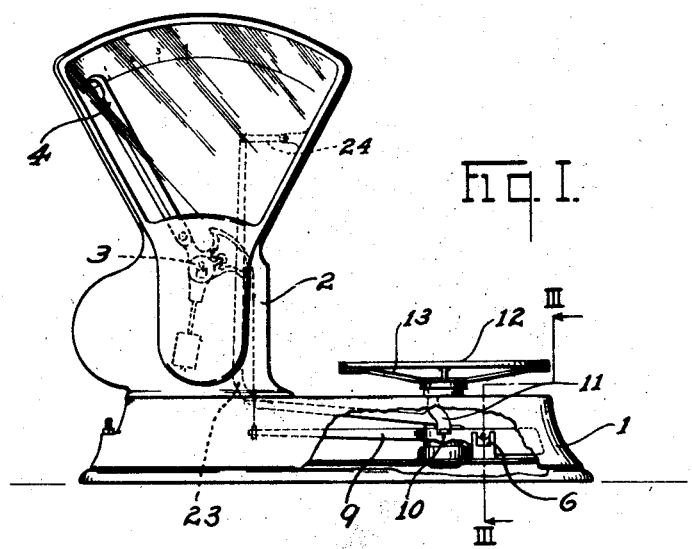
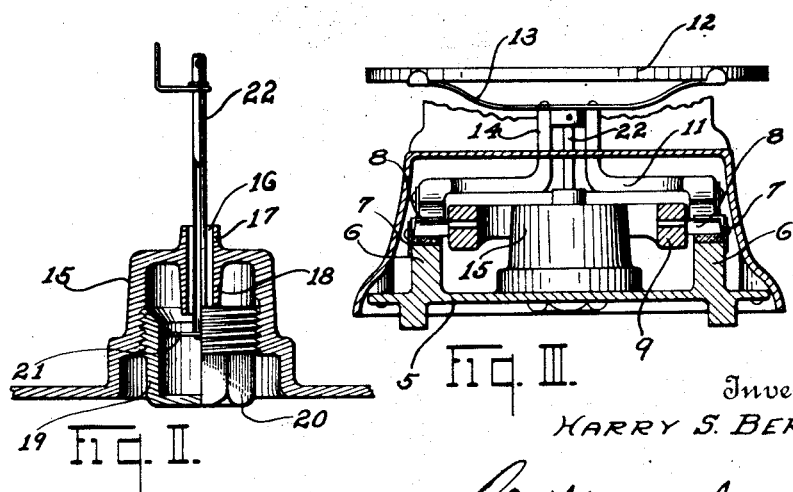
Inventor
HARRY S. BERGEN.
By C. O. Marshall
Attorney Patented Mar. 18, 1924.

1,486,944

UNITED STATES PATENT OFFICE.

HARRY S. BERGEN, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed March 22, 1922. Serial No. 545,650.

*To all whom it may concern:*

Be it known that I, HARRY S. BERGEN, a citizen of the United States, residing at Toledo, in the county of Lucas and State of Ohio, have invented certain new and useful Improvements in Weighing Scales, of which the following is a specification.

This invention relates to weighing scales, and particularly to automatic scales having means for damping the vibrations or oscillating movements of the weighing mechanism.

One of the principal objects of the invention is the provision of economical and efficient means for mounting platform lever mechanisms and dash pot damping devices for scales of this type.

Another object is the provision of a novel form of dash pot which is readily accessible for the purpose of re-filling.

Other objects and advantages will be apparent from the following description, in which reference is had to the accompanying drawings illustrating a preferred embodiment of my invention and in which similar reference numerals designate similar parts throughout the several views.

In the drawings:—

Figure 1 is an elevational view of a scale embodying my invention, a portion of the base thereof being broken away for the purpose of displaying the parts of the scale to which my invention particularly relates;

Figure 2 is an enlarged sectional view showing the dash pot and adjacent parts; and Figure 3 is an enlarged sectional view taken substantially on the line 3—3 of Figure 1.

Referring to the drawings in detail, the base 1 of the scale forms a housing which contains the platform lever mechanism and supports at one of its ends an upright casing 2 containing the automatic load-offsetting mechanism 3 and the indicating mechanism 4. The upright casing 2, as shown, is of the character employed on a type of automatic scales known as the " fan " type. It is to be understood that the base and upright casing shown in the drawings are merely illustrative and that my invention is applicable to scales of other types.

Secured to lugs within the base 1 is a bottom plate 5 upon which are formed fulcrum stands 6, in the upper ends of which are mounted fulcrum bearings 7 of agate or other suitable material. The bearings 7 rockably support knife-edged fulcrum pivots 8 which are secured to the main lever 9 of the scale. The lever 9 is also provided with load pivots 10 which support the spider 11 that carries the platform or other commodity-receiver 12. The upper portion 13 of the platform spider 12 is detachably secured to an upwardly-extending portion 14 of the spider, which projects through an opening in the upper side of the base 1.

Formed upon the plate 5 is an upwardly-extending boss 15, the cross-sectional shape of which is best illustrated in Figure 2. The boss has an opening 16 in its upper end which is surrounded by an upwardly-extending flange 17 and a downwardly-extending flange 18, and threaded into the lower or open end of the boss is a cup-like dash pot 19 which is provided with facets 20 adapted to be engaged by a wrench.

The interior of the dash pot 19 is adapted to contain a liquid damping medium. The inside wall is preferably smooth and perfectly cylindrical, and the dash pot contains a plunger 21 which is secured to the lower end of a plunger rod 22, the upper end of the rod 22 being pivotally attached to the platform spider 11. An L-shaped check rod 23 is also secured to the spider 11, the horizontal portion of the rod lying within the base 1 and the upright portion extending into the case 2 and being connected at its upper end to a check link 24.

With the parts constructed and arranged in the manner shown in the drawing and set forth in the foregoing paragraphs, the platform lever 9, platform spider 11 and check link 23 may be assembled upon the bottom plate 5 and the plate 5 thereafter fastened in place in the base 1. The lever 9 may then be connected to the load-offsetting mechanism 3, the detachable portion 13 of the platform spider and the commodity-receiver may be fixed in place, and the check rod 23 connected to the link 24. The preliminary assembly of the platform lever, platform spider and dash pot upon the bottom plate 5 greatly facilitates the assembly of the complete scale.

With the bottom plate and dash pot constructed and arranged in the manner illustrated and described, it is apparent that the dash pot 19 may be easily removed from the bottom plate when it is desirable to re-fill it, whereas if the dash pot were provided with a removable cover, according to the usual practice, such cover would be inside the base 1 and inaccessible without partly disassembling the scale. The construction of the boss 15 and the flanges 17 and 18 which surround the opening 16 is such that if the scale is tipped over the contents of the dash pot will remain in the boss 15, being prevented from running through the opening 16 by the flange 18, while the flange 17 acts as a guard to prevent particles of foreign material from falling through the opening 16 into the dash pot.

While it will be apparent that the illustrated embodiment of my invention herein disclosed is well calculated to adequately fulfill the objects primarily stated, it is to be understood that the invention is susceptible to variation, modification and change within the spirit and scope of the subjoined claims.

Having described my invention, I claim:

1. In a device of the class described, in combination, a plate, a hollow upwardly-projecting boss formed thereon, said boss being open at its lower end, and a dash pot removably fixed within the open lower end of said boss.

2. In a device of the class described, in combination, a plate, a hollow upwardly-projecting boss formed upon said plate, said boss having an opening in its upper end, said opening being surrounded by a flange projecting into said boss, said boss being open at its lower end, and a dash pot removably fixed within the open lower end thereof.

3. In a device of the class described, in combination, a plate, a hollow upwardly-projecting boss formed upon said plate, said boss having an opening in its upper end, said opening being surrounded by a flange projecting into said boss, said boss being open at its lower end, a dash pot removably fixed within the open lower end thereof, a plunger contained within said dash pot, and a plunger rod connected to said plunger and extending through the opening in the upper end of said boss.

4. In a device of the class described, in combination, a hollow base forming a housing, a bottom plate removably secured to said housing, lever mechanism supported upon said bottom plate, a hollow boss formed upon said bottom plate and extending into said housing, said boss being open at its lower end, and a dash pot removably fixed in the open lower end thereof.

5. An article of manufacture comprising, in combination, a plate, fulcrum stands formed on said plate, and an upwardly-extending hollow boss formed upon said plate, said boss being adapted to removably receive a dash pot.

HARRY S. BERGEN.

Witnesses:
FRANCES DOYLE,
H. O. ERNSBERGER.